(12) United States Patent
Foos

(10) Patent No.: US 6,209,607 B1
(45) Date of Patent: Apr. 3, 2001

(54) CONDUIT-MAKING APPARATUS WITH A MULTIPLE DIAMETER WINDING DRUM

(75) Inventor: George J. Foos, Grand Rapids, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 09/255,356

(22) Filed: Feb. 23, 1999

(51) Int. Cl.$^7$ ................................................ B65H 81/00
(52) U.S. Cl. .................... 156/428; 156/244.13; 156/195; 156/425; 156/429
(58) Field of Search .................... 156/425, 428, 156/189, 195, 244.12, 244.15, 244.13, 429, 190

(56) References Cited

U.S. PATENT DOCUMENTS

| | | |
|---|---|---|
| 2,378,211 | 6/1945 | Furness . |
| 3,555,170 | 1/1971 | Petzetakis . |
| 3,728,883 | 4/1973 | Lamborn et al. . |
| 3,748,952 | 7/1973 | Petzetakis . |
| 3,781,041 | 12/1973 | Petzetakis . |
| 3,843,302 | 10/1974 | Petzetakis . |
| 3,870,441 | 3/1975 | Petzetakis . |
| 3,914,151 | 10/1975 | Poulsen . |
| 3,917,500 | 11/1975 | Petzetakis et al. . |
| 3,926,223 | 12/1975 | Petzetakis . |
| 3,953,057 | 4/1976 | Petzetakis . |
| 4,033,808 | 7/1977 | Petzetakis . |
| 4,042,231 | 8/1977 | Kopczynski et al. . |
| 4,164,135 | 8/1979 | Clavin . |
| 4,172,748 | 10/1979 | Petzetakis . |
| 4,177,914 | 12/1979 | Clavin . |
| 4,233,020 | 11/1980 | Oswald . |
| 4,389,180 | 6/1983 | Gordon . |
| 4,436,574 | 3/1984 | Long et al. . |
| 4,575,400 * | 3/1986 | Ueda et al. .................... 156/428 |
| 4,793,790 | 12/1988 | Reinhold . |
| 4,824,502 * | 3/1986 | Nagayoshi et al. .................... 156/195 |
| 4,867,671 | 9/1989 | Nagayoshi et al. . |
| 5,060,698 | 10/1991 | Anastassakis et al. . |
| 5,076,025 | 12/1991 | Reeble . |
| 5,217,723 | 6/1993 | Tsingopoulos . |
| 5,261,988 | 11/1993 | Dikis et al. . |
| 5,285,947 | 2/1994 | Depperman . |
| 5,330,345 | 7/1994 | Strock et al. . |
| 5,460,501 | 10/1995 | Wise et al. . |
| 5,505,897 | 4/1996 | Wise et al. . |
| 5,535,938 | 7/1996 | Leduc . |
| 5,945,138 * | 8/1999 | Wise et al. .................... 156/429 X |

FOREIGN PATENT DOCUMENTS

| | | |
|---|---|---|
| WO 8905723 | 6/1989 | (WO) . |
| 9527601 | 10/1995 | (WO) . |

OTHER PUBLICATIONS

PCT International Search Report from International Application No. PCT/US00/04102 dated Aug. 2, 2000.
PCT International Search Report from International Application No. PCT/US00/04104 dated Aug. 2, 2000.

* cited by examiner

*Primary Examiner*—Jeff H. Aftergut
(74) *Attorney, Agent, or Firm*—Jones, Day, Reavis & Pogue

(57) ABSTRACT

An apparatus is disclosed for making a conduit or pipe. An extruder is provided for producing a strip of continuous thermoplastic. A winding drum receives the strip and helically winds the strip around the drum's perimeter to form a conduit having an inner diameter corresponding to the outer diameter of the drum. The drum includes a core tube surrounded by a plurality of rollers which define the outer diameter of the drum. The rollers rotate to advance the strip around the drum. A pair of detachable plates are provided for supporting said rollers. Each plate has a plurality of support structures for receiving and removably supporting each of said rollers at either end, at a desired radial distance from the drum axis, in order to define the drum diameter. The pair of plates is part of a plurality of pairs of plates, with each pair being of a different diameter to manufacture pipe or conduit of a variety of different diameters.

3 Claims, 6 Drawing Sheets

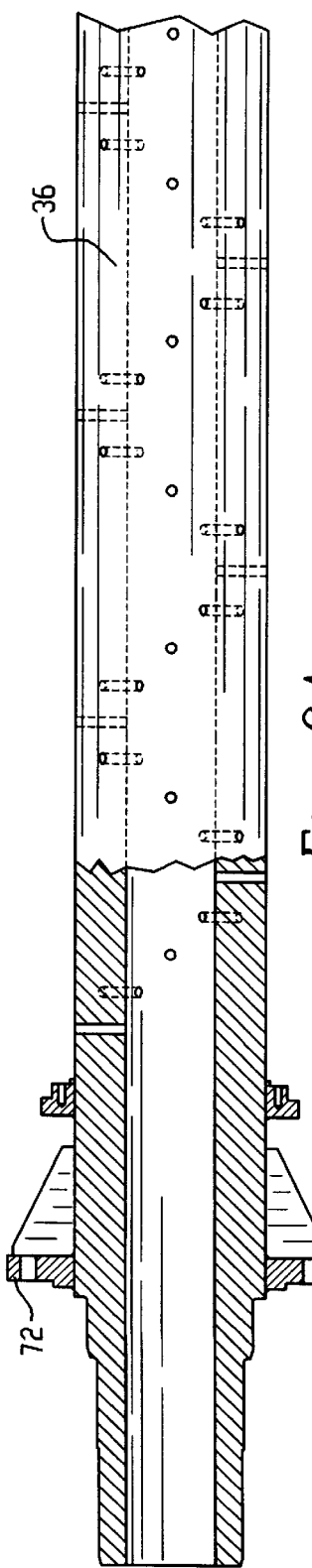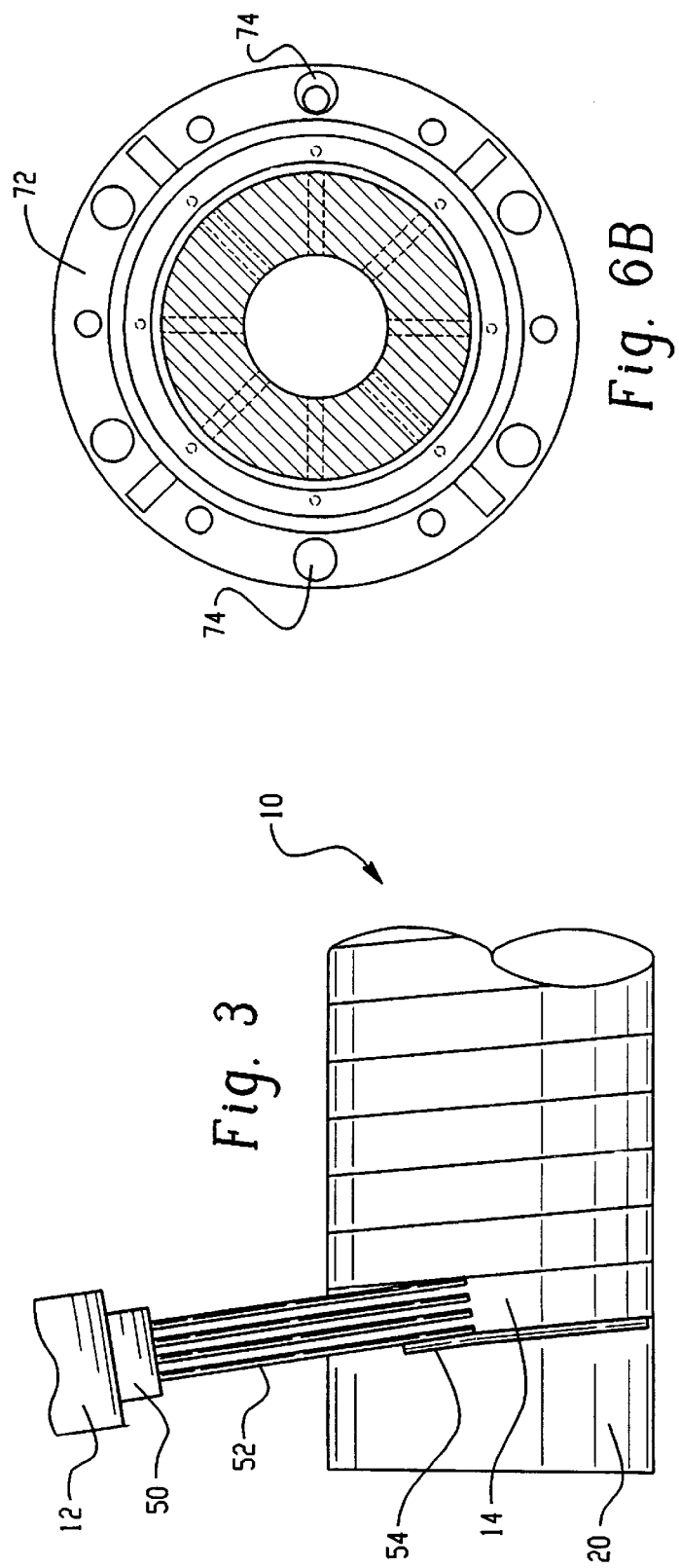

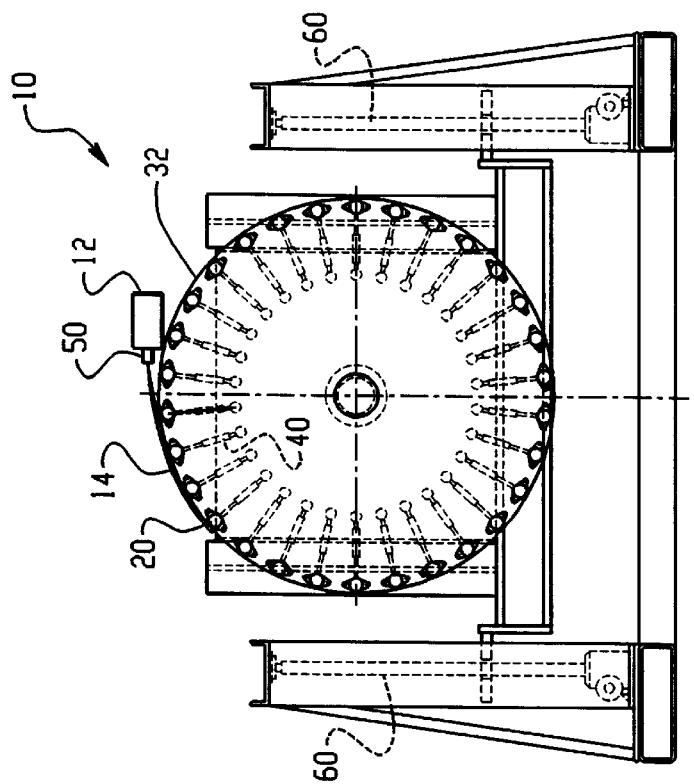
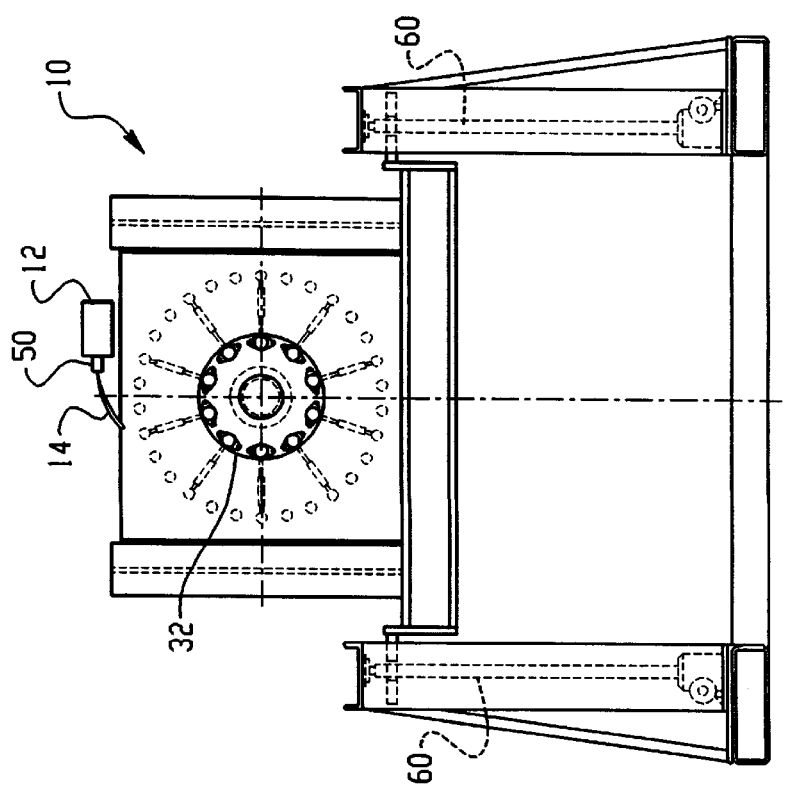

US 6,209,607 B1

CONDUIT-MAKING APPARATUS WITH A MULTIPLE DIAMETER WINDING DRUM

BACKGROUND OF THE INVENTION

The present invention is directed to the field of apparatuses for the formation of large-diameter ducts, pipes, conduits or the like, generally cylindrical in shape, from an extruded thermoplastic strip. U.S. Pat. No. 4,033,808 to Petzetakis discloses an apparatus for making large-diameter pipe from thermoplastic resin, the disclosure of which is hereby incorporated by reference. A synthetic-resin, hollow-profile strip is extruded and coiled helically around a winding drum to make a continuous tube. Adjacent turns of the helix are thermally fused together with axial pressure being applied on the strip so as to make a liquid-tight tube which can be used for a number of applications, particularly for subterranean use, e.g. as a waste or sewer conduit, storm sewer, or any other liquid conveyance.

The previous apparatus includes a drum for forming the conduit therearound, and the drum includes a core tube surrounded by a plurality of rollers upon which the extruded thermoplastic rolls as it rotates around the drum. The drum of the previous apparatus is fixed in diameter, and so only one diameter of pipe may be produced with each apparatus. Since a typical manufacturer of pipe manufactures conduit or pipe of several different diameters, it would be necessary to purchase and maintain several such apparatuses, which would involve considerable investment and ongoing expense.

In a conventional conduit-making process, "residence time" is the period in which plastic remains on the drum during the manufacturing process. Since the rate of manufacture is limited by residence time, it would be desirable to shorten this interval by increasing the drum speed. Typical manufacturing rates can range from 300 to 3500 lbs./hr. depending on the size of the pipe. Usually, large-diameter conduit or pipe is manufactured at about 1000–2000 lbs./hr. As the rate is increased, however, the conduit may not be completely cooled when coming off the end of the drum. This makes the conduit shrink slightly inward, undesirably decreasing the final conduit diameter by a small, yet significant, amount.

SUMMARY OF THE INVENTION

In view of the above-indicated drawbacks with the previous device apparatus, there is therefore a need for a pipe or conduit-making apparatus which preserves the advantages of the previous device while manufacturing large diameter pipes and conduits of more than one diameter.

There is also a need for an apparatus having a drum that permits precision variations in pipe/conduit diameter to allow for the decreasing of residence time, thereby increasing the rate of manufacture.

These needs and others are satisfied by the present invention in which an apparatus for making a pipe or conduit is disclosed. An extruder is provided for producing a strip or ribbon of continuous thermoplastic. A winding drum receives the strip from the extruder in a pliable, fusible, substantially melted state, and helically winds the strip around the drum's perimeter to form a conduit having an inner diameter corresponding to the outer diameter of the drum. The drum includes a core tube surrounded by a plurality of rollers which define the outer diameter of the drum. The rollers rotate to advance the strip around the drum.

A pair of detachable plates is provided, one at each end of the core tube, for supporting said rollers. Each plate has a plurality of support structures for receiving and removably supporting each of said rollers at each end, at a desired radial distance from the drum axis, in order to define the drum diameter.

The detachable plates are part of a set of such plates, each having support structures at various radial distances from the drum axis, so as to provide a means for manufacturing drums of plurality of diameters simply by interchanging different size plates.

As will be appreciated, the invention is capable of other and different embodiments, and its several details are capable of modifications in various respects, all without departing from the invention. Accordingly, the drawings and description are to be regarded as illustrative in nature and not restrictive.

BRIEF DESCRIPTION OF THE DRAWINGS

The embodiments of the invention will now be described by way of example only, with reference to the accompanying figures wherein the members bear like reference numerals and wherein:

FIG. 3 is a top detail view of the present extruder head and related components.

FIGS. 4A and 4B are frontal views illustrating different diameter configurations of the winding drum as according to the present invention.

FIGS. 6A and 6B are respective side and cross-sectional views showing the present core tube.

DETAILED DESCRIPTION OF THE INVENTION

Figure 1:
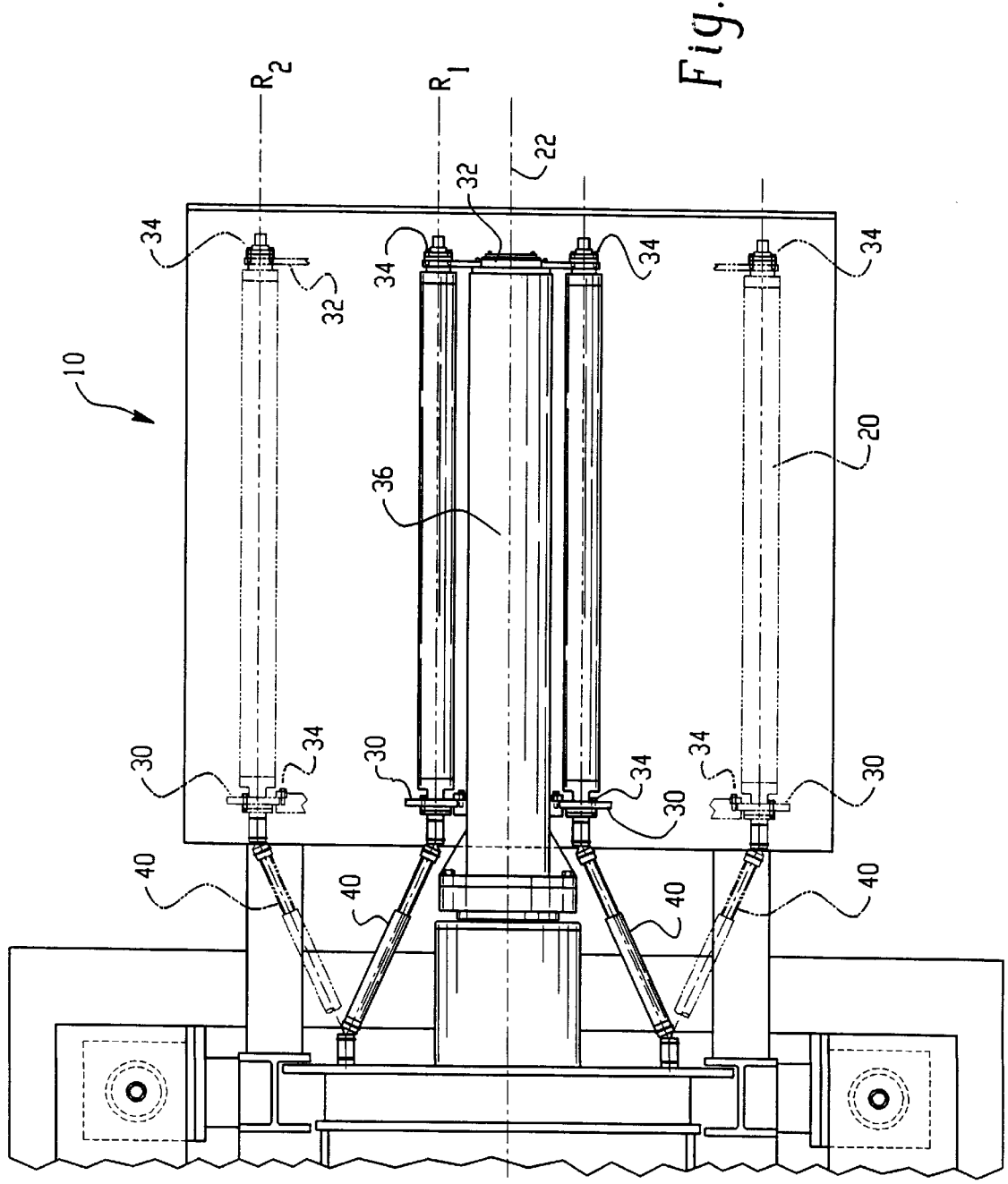
FIG. 1 is a top-sectional view illustrating the apparatus with the multiple-diameter winding drum as according to the present invention.

The figures are for purposes of illustrating the preferred embodiment of the invention and not for limiting the same. The present invention is directed to a pipe or conduit-making apparatus having a multiple-diameter winding drum generally indicated by reference numeral 10. An extruder 12 is provided to extrude a continuous strip or ribbon 14 of thermoplastic of such material as is appropriate for conduit or pipe manufacture, including but not limited to PVC, polyethylene or any other suitable type of plastic material. The winding drum 10 receives the strip of thermoplastic in a pliable, fusible, substantially melted state, and rotates as described in detail below to helically wind the strip around the perimeter of the drum. The conduit formed thereby has an inner diameter corresponding to the outer diameter of the drum 10.

The drum 10 includes a core tube 36 surrounded by a plurality of rollers 20. The outer diameter of the drum 10 is defined by the plurality of rollers 20, which axially rotate as the strip advances around the drum 10. The plastic making up the pipe is extruded in a rectangular ribbon configuration, called a "profile". The shape of the profile, as it is wrapped onto the rollers of the drum, is preferably formed by a die 50, having calibration rods 52, and attached to the extruder 12, as is shown in FIG. 3. The position of the profile is preferably set by a guide plate 54, which urges the profile into contact with the adjoining wrap, as is also shown in FIG. 3. Of course, it should be appreciated that any other means of shaping and positioning the profile can be used without departing from the invention.

The rollers are cocked and slightly slanted along the drum to create a helix angle. As the profile winds around the diameter of the drum, it also coils longitudinally along the drum axis 22 following the helix angle. The calibration rods 52 and guide plates 54 are aligned so that the straight profile coming off the extruder meets edge to edge the plastic wrapping up from the previous turn of the drum. Since the plastic is still somewhat melted, the two sections fuse to form a weld.

With the present invention, the rollers 20 are supported with a pair of detachable plates, a bulkhead plate 30 and an outward bulkhead plate 32. Each plate 30, 32 includes a plurality of support structures for receiving and removably supporting each of the rollers 20 at each end. In the preferred embodiment, the support structures are bolt holes 34 for receiving the spindle of each roller 20. The bolt holes 34 are positioned at a desired radial displacement from the drum axis, so as to define a desired drum diameter.

In the present invention, the plates 30, 32 are a part of a set of pairs of such detachable plates. In each pair of plates, 30, 32, the bolt holes 34 are formed at a substantially different radial displacement, so that a drum 10 of a different diameter can be formed by substituting a different pair of detachable plates 30, 32. The rollers likewise are detachable from the plates so that the number of rollers 20 is adjusted to provide a multiple-diameter drum 10 with rollers 20 spaced substantially equidistant along the drum diameter in accordance with a chosen plate size.

Figure 2:
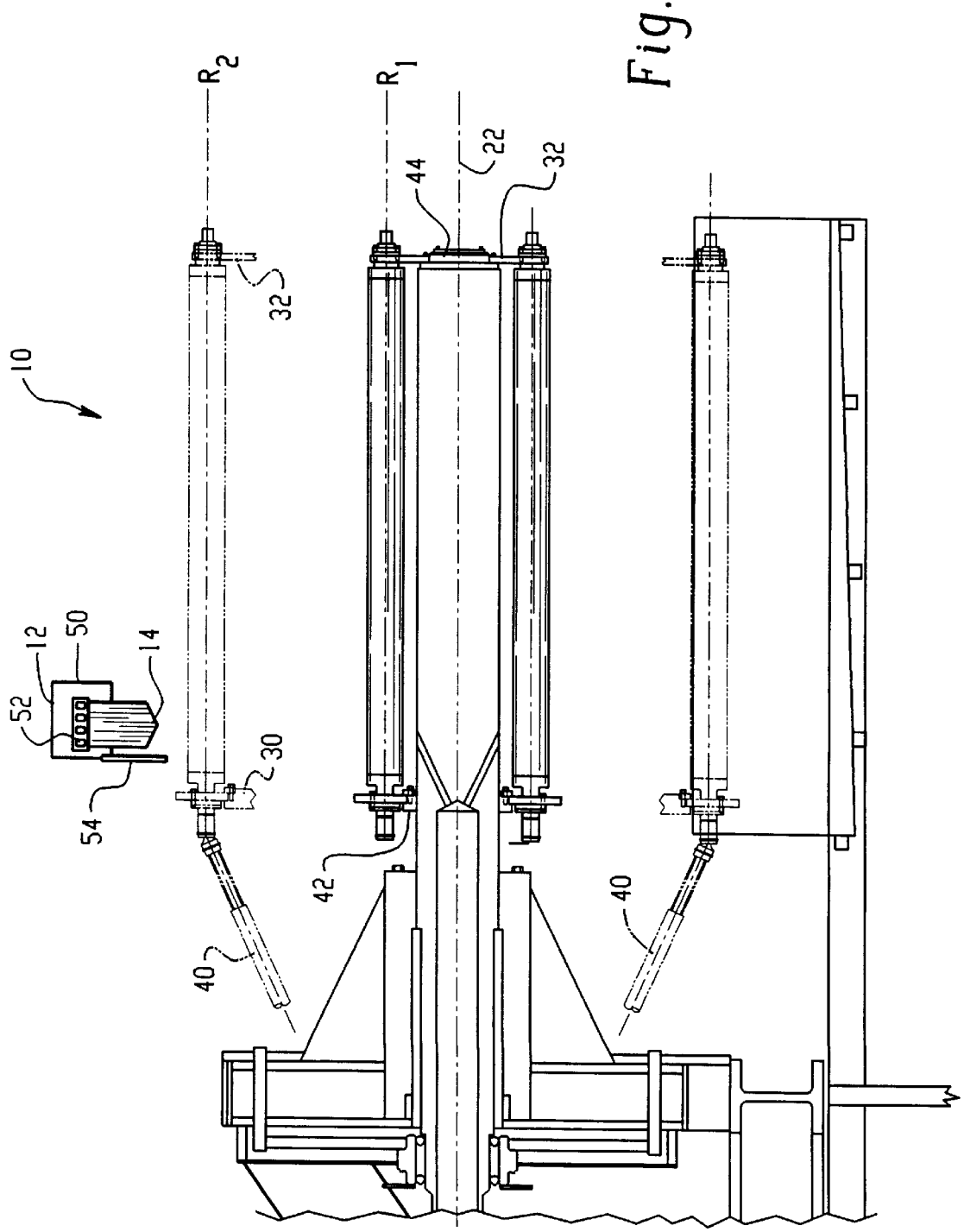
FIG. 2 is a side-sectional view illustrating the apparatus with the multiple-diameter winding drum as according to the present invention.

FIGS. 1 and 2 show alternative drum diameters which use respective plates 30, 32 having bolt holes 34 with respective radial displacements from R1 to R2. As seen in FIG. 4A, a pair of small plates 30, 32 having bolt holes 34 to accommodate ten rollers can be used to form a 21 inch drum at radial displacement R1. As seen in FIG. 4B, a pair of large plates 30, 32 having bolt holes to accommodate 30 rollers can be used to form a 60 inch drum at radial displacement R2. Another feature of the invention, as seen in FIGS. 4A and 4B is an elevation mechanism which moves the entire drive system (including the plates 30, 32, rollers 20, core tube 36, core tube hub assembly, and drive motors) up and down to align the charge end of the drum 5 to the same elevation as the extruder die 50. The elevation mechanism includes lifts 60, which provide a variable height to the drum, to accommodate the wide variations in drum sizes at a desired height above the floor. The lifts 60 each include a motor to drive a jack screw which moves the drive system up and down. In this manner, the drum can be easily aligned with the die for different drum sizes. By manufacturing appropriately sized plates 30, 32 with a sufficient number of bolt holes to accommodate the rollers 20, a drum can be formed to produce a conduit of any desired diameter. Common nominal sizes include 21", 24", 27", 30", 42" 48", 54" and 60", but can also include larger or smaller drum sizes without departing from the invention. Plates can also be formed to accommodate metric sizes which are commonly used outside the United States.

The plate 30 is movably supported on the core tube 36 at the charge end of the drum 10 by mounting to a free floating bearing hub 42. This allows the plate 30 to be moved with the rollers for properly positioning the weld alignment of the profile to the previous profile wrap. The plate 32 is rigidly supported to the core tube 36 at the discharge end of the drum 10 by mounting the plate to the rigid mounting hub 44. A roller drive system is included having a plurality of universal joints 40 which distribute the rotating drive load about the drum 10. The number of universal joints 40 is selected to correspond to the number of rollers 20, and the universal joints are secured to the spindles of the rollers 20 through the bolt holes 34. The present invention, as described herein, can provide a multiple-diameter drum for producing pipes or conduit of various sizes, thus saving the expense of acquiring and maintaining multiple apparatuses.

Figure 5:
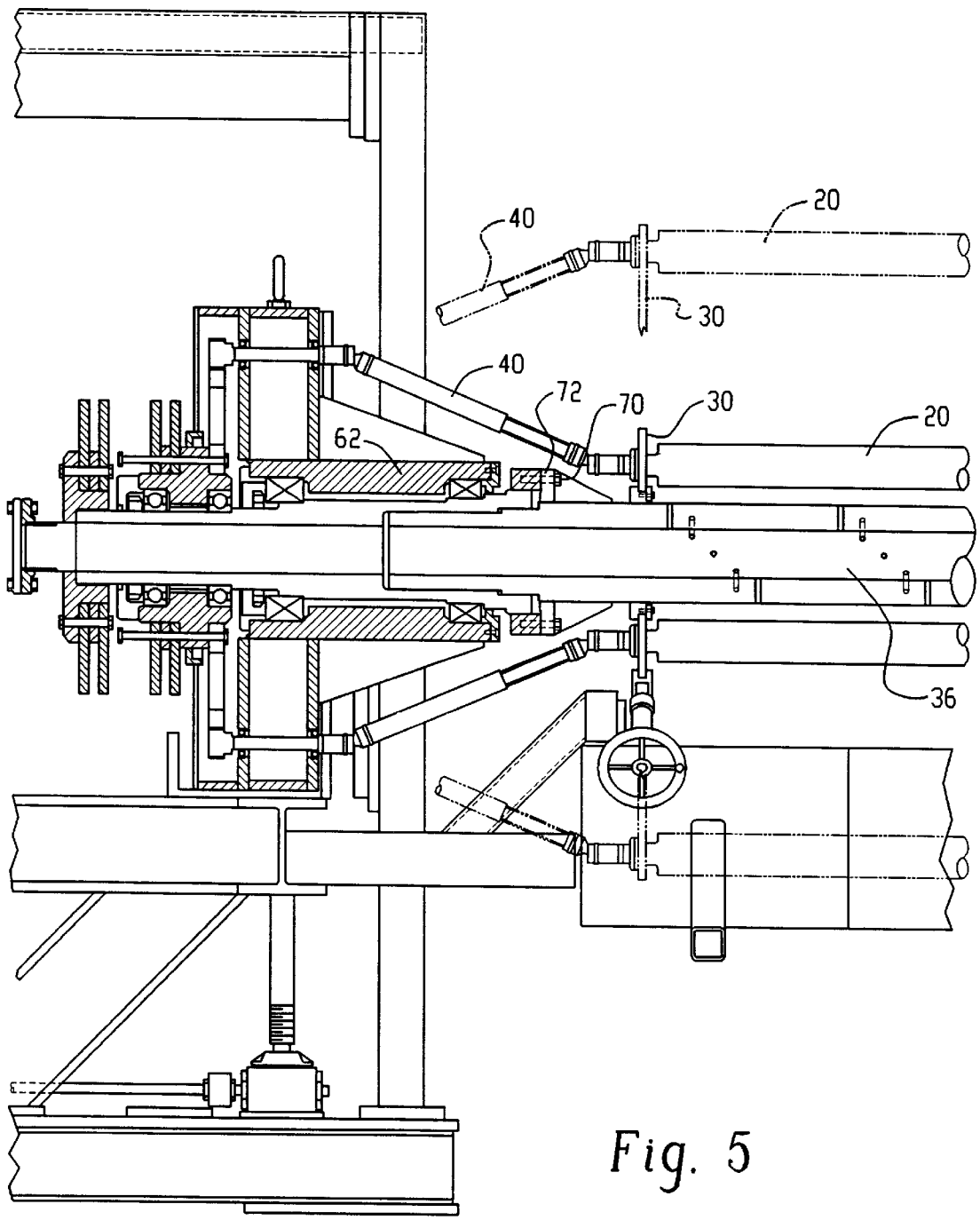
FIG. 5 is a side-sectional view of the present multiple-diameter winding drum, showing particular details of the "quick change" assembly.

As best shown in FIGS. 5, 6A and 6B, in order to achieve a high level of efficiency in changing from one drum size to another, the present invention also includes a "quick change" tooling, including a uniform core tube 36 that can be detached from a core tube mounting hub 62. In this manner, a second uniform core tube having a different drum size can be constructed while production is underway, thus improving manufacturing efficiency.

Figure 7A:
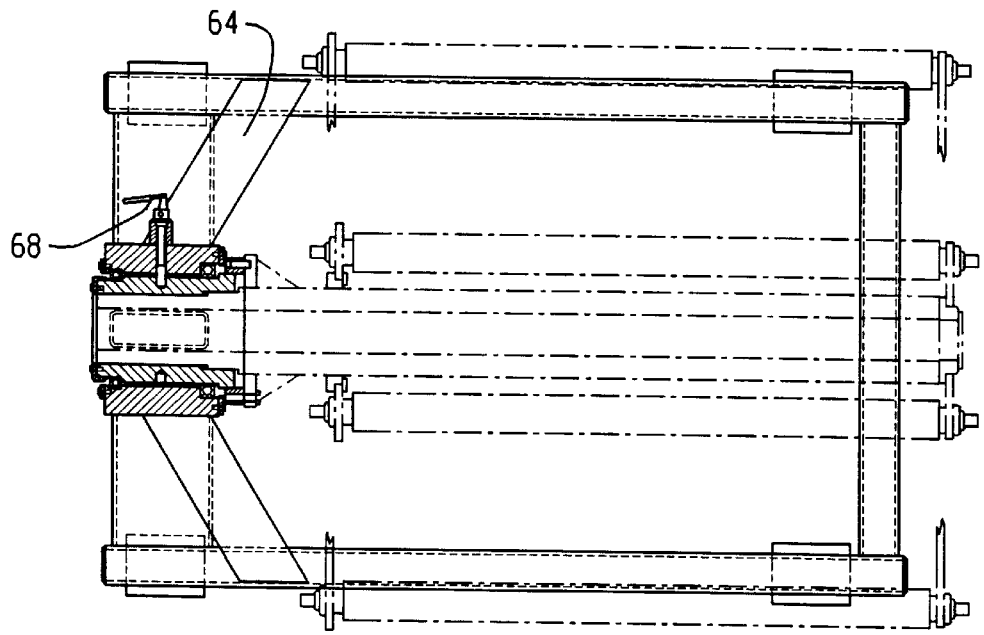
FIGS. 7A and 7B illustrate the change cart used with the present "quick change" assembly.
Figure 7B:
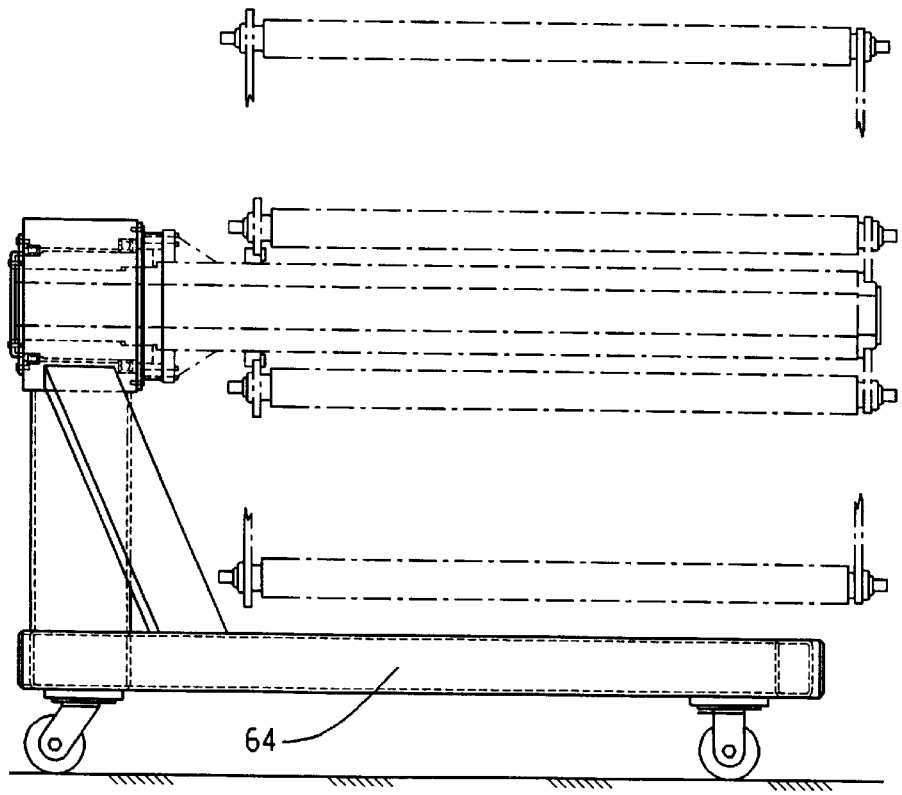

As shown in FIGS. 7A and 7B, a second drum assembly can be assembled by first connecting a second uniform core tube to a change cart 64.

Then both charge end and discharge end plates 30, 32 are assembled to the core tube 36. Rollers 20 are then mounted on the respective hubs which are attached to the plates 30, 32. As each roller 20 is added to the entire assembly it is rotated so that another roller 20 can be assembled. The ability to rotate the assembly during addition of the rollers greatly enhances the ease for which the entire assembly process can occur. A locking pin 68 is provided to lock the rotating assembly in place during assembly of each roller.

In removing the core tube 36 from the core mounting hub 62, all drive shafts 40 are disconnected from the rollers 20. Afterwards, the core tube 36 is disconnected from the core mounting hub 62 by removing mounting bolts 70 from a mounting hub 72. Ejector bolts 74 are then screwed inward towards the mounting hub to release the core tube 36 from the hub 62. This entire assembly is then removed by an overhead crane system and transported to a second cart 64 where it is loaded and then disassembled. The new drum size is then lifted off of the assembly cart 64 by an overhead crane system and transported to the drum power unit where it is attached in like manner to the core assembly hub.

In another embodiment, the present invention can be modified to accommodate increased manufacturing rates by accounting for the slight shrinkage of conduit diameter as the conduit comes off the drum. This is accomplished by providing a plurality of concentric sets of bolt holes 34 located at a plurality of radial distances along each respective plate 30, 32. Each set of bolt holes is offset slightly from the other. For example, plates for manufacturing 60 in. diameter pipe may have bolts holes at 30 in. plus 0.200 inches or minus 0 inches from the center of the plate. In this way, the rollers 20 can be mounted to achieve minute adjustments of the drum diameter, and thus the diameter of the ultimate conduit product. Residence time can thereby be shortened, since the resultant slight decrease in conduit diameter by increasing manufacturing speed can be offset by a corresponding increase in drum diameter. Using the previous apparatus, plastic is optimally extruded at a rate of about 1000 lbs./hr. for most common pipe sizes. With the present invention, this rate can be increased to between 1500–2000 lbs./hr., or even higher, with a corresponding increase in rate of manufacture of between 50–100% or more.

As described hereinabove, the present invention solves many problems associated with previous systems, and presents improved efficiency and reduced expense. However, it will be appreciated that various changes in the details, materials and arrangements of parts which have been herein described and illustrated in order to explain the nature of the invention may be made by those skilled in the art within the principle and scope of the invention as expressed in the appended claims.

I claim:

1. An apparatus for defining a winding drum that is rotatable about a drum axis to helically wind an extruded strip of thermoplastic from an extruder around the perimeter of said drum to form a conduit having an inner diameter corresponding to the outer diameter of said drum, said apparatus comprising:

a rotatable drive mechanism;

an axially elongated hub structure mounted on said drive mechanism so as to rotate about said drum axis upon operation of said drive mechanism;

a plurality of rollers; and a plurality of plates having support structures that receive opposite ends of said rollers to removably support said rollers on said hub structure in a cylindrical array at a predetermined radial displacement from said drum axis in order to define said outer diameter of said drum;

said plates including a plurality of pairs of interchangeable plates that are interchangeable on said hub structure while said hub structure remains mounted on said drive mechanism, said pairs including a first pair of interchangeable plates configured to support a first number of said rollers on said hub structure at a first radial displacement from said drum axis, and a second pair of interchangeable plates configured to support a second, greater number of said rollers on said hub structure at a second, greater radial displacement from said drum axis.

2. An apparatus as defined in claim 1 wherein said support structures define bolt holes that receive the ends of said rollers.

3. An apparatus as defined in claim 1 wherein said hub structure is a core tube.

\* \* \* \* \*